June 1, 1965
C. R. LYLES
3,186,745
WELL TOOLS
Filed March 21, 1961
10 Sheets-Sheet 1
FIG.1
FIG.2
FIG.3
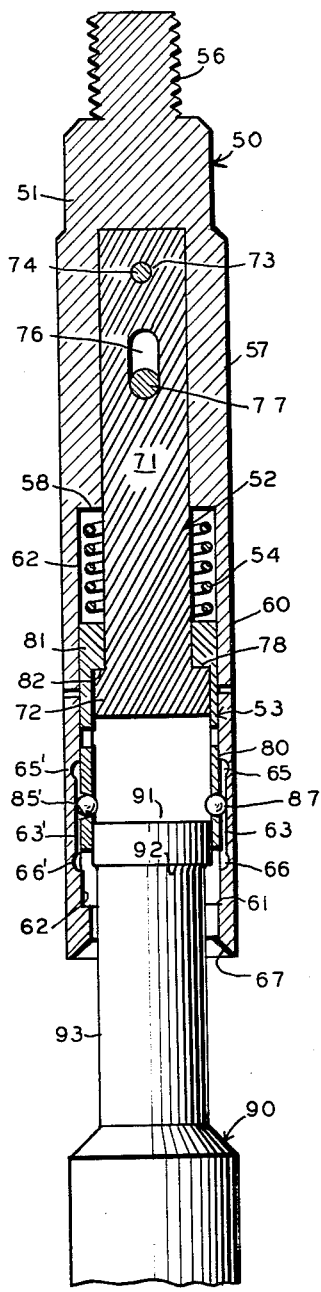
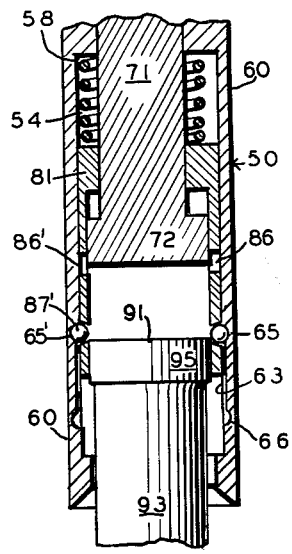
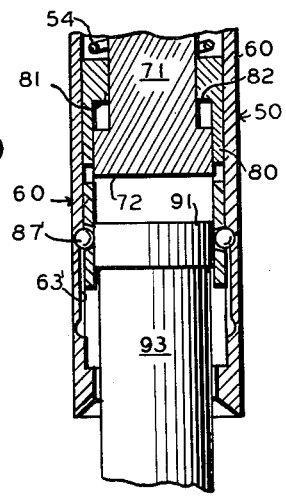
C.R. LYLES
INVENTOR.
BY
Ely Silverman
ATTORNEY June 1, 1965  C. R. LYLES  3,186,745
WELL TOOLS Filed March 21, 1961  10 Sheets-Sheet 2

C. R. LYLES
INVENTOR.

BY Ely Silverman
ATTORNEY

June 1, 1965  C. R. LYLES  3,186,745
WELL TOOLS
Filed March 21, 1961  10 Sheets-Sheet 3

C. R. LYLES
INVENTOR.

BY
Ely Silverman
ATTORNEY

June 1, 1965  C. R. LYLES  3,186,745
WELL TOOLS
Filed March 21, 1961  10 Sheets-Sheet 4

C. R. LYLES
INVENTOR.

BY
Ely Silverman
ATTORNEY

June 1, 1965  C. R. LYLES  3,186,745
WELL TOOLS

Filed March 21, 1961  10 Sheets-Sheet 5

C. R. LYLES
INVENTOR.

BY
Ely Silverman
ATTORNEY

C. R. LYLES
INVENTOR.

BY Ely Silverman

ATTORNEY

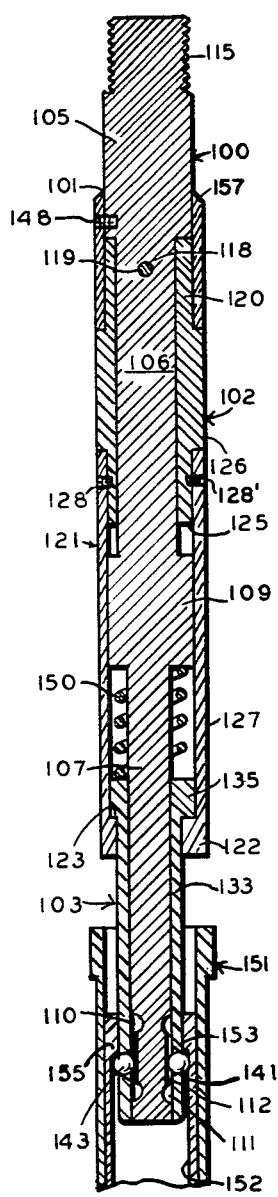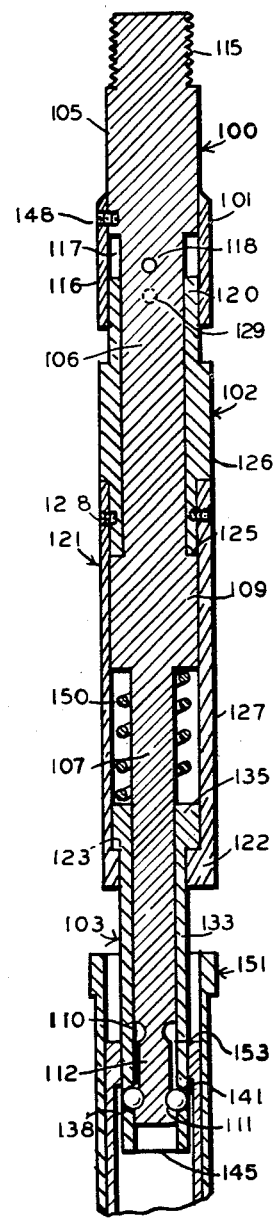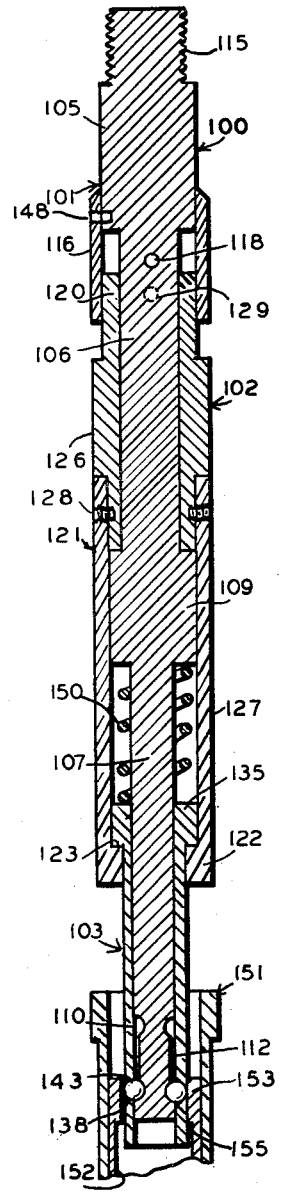

June 1, 1965

C. R. LYLES 3,186,745

WELL TOOLS

Filed March 21, 1961

C.R. LYLES
*INVENTOR.*

BY Ely Silverman

ATTORNEY

C. R. LYLES
*INVENTOR.*

BY Ely Silverman
ATTORNEY

June 1, 1965  C. R. LYLES  3,186,745
WELL TOOLS
Filed March 21, 1961  10 Sheets-Sheet 10

INVENTOR.
C.R. LYLES
BY Ely Silverman
ATTORNEY

United States Patent Office 3,186,745
Patented June 1, 1965

3,186,745
WELL TOOLS
Cecil Ray Lyles, Borger, Tex.
(2101 E. 16th St., Farmington, N. Mex.)
Filed Mar. 21, 1961, Ser. No. 97,287
4 Claims. (Cl. 287—119)

This invention relates to well tools. More particularly, this invention relates to improved pulling and running tools.

One object of this invention is to provide an improved combination of pulling and running tools and downwell tools.

Another object of this invention is to provide improved pulling and running tools.

Another object of this invention is to provide pulling and running tools adapted to set inside the fishing neck of the tool to be moved thereby.

Yet another object of this invention is to provide improved running and pulling tools adapted to set on the outside of the fishing neck of the tool to be moved thereby.

Another object of this invention is to provide a collar stop adapted to be moved and set by pulling and running tools of this invention.

Other objects of this invention will be apparent to those skilled in the art on study of the below disclosure of which the drawings attached hereto from a part.

In the attached drawings, wherein like numerals refer to like parts in the various figures;

FIGURE 1 is an overall longitudinal cross-sectional view of one embodiment of this invention during an initial stage of approximation of a pulling and running tool of this invention with the fishing neck of the tool to be moved thereby;

FIGURE 2 is a longitudinal cross-sectional view of a portion of the device of FIGURE 1 in a stage subsequent to that shown in FIGURE 1;

FIGURE 3 is a longitudinal cross-section of a portion of the device of FIGURE 1 in a stage of the joining of said device with the fishing neck of the tool to be moved in a stage subsequent to that shown in FIGURE 2;

FIGURE 19 is a longitudinal cross-sectional view of the devices of FIGURE 12 showing the pulling and running tool of FIGURE 12 locked to the fishing neck of the tool to be moved in a supporting position for said tool;

FIGURE 20 is a longitudinal cross-sectional view of the apparatus of the embodiment of the apparatus shown in FIGURE 19 during the initial stage of separation of the components thereof by a shearing-up action;

FIGURE 21 is a longitudinal cross-sectional view of the apparatus of FIGURE 12 in a stage subsequent to that shown in FIGURE 20 during the shear-up separation of the components of that apparatus;

Figure 4:
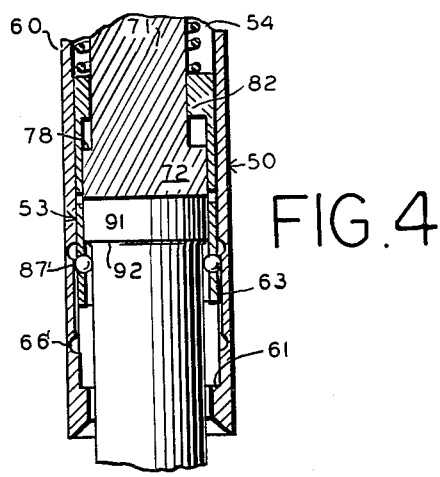
FIGURE 4 is a cross-sectional longitudinal view of portions of the devices of FIGURE 1 in a stage of joining of that device and a well tool subsequent to that shown in FIGURE 3.

One embodiment of the invention herein comprises a pulling and running tool 50 shown in FIGURE 1, said pulling and running tool comprising, generally, a yoke 51, a hanger 52, a locking sleeve 53 and a spring 54 adapted said tool being to pick up and release a well tool as 99.

The yoke 51 comprises a cylindrical head 55 (1¾ diameter in the preferred embodiment), a screw thread 56 projecting from the top thereof (1 inch in diameter 1¼ inches high in the preferred embodiment), a thick walled cylinder 57 (3 inches long in the preferred embodiment and ½ inch thick) having a shoulder 58 at its lower end, and a relatively thin-walled sleeve 60 (3/16 of an inch thick, 5½ inches long in the preferred embodiment), said sleeve provided at its bottom within an inwardly projecting annular shoulder 61. The inner wall 62 of the yoke sleeve 60 is provided with a plurality of longitudinally extending radially equispaced flutes as 63, 63′, 63″ (1/16 of an inch deep and 1 inch long and 12 in number in the preferred embodiment). At the top of each flute as 63 and 63′ is a hemispherical upper recess, as 65, and 65′. At the bottom of each flute as 63 and 63′ is a hemispherical lower recess as 66 and 66′; in the preferred embodiment these flutes are cylindrically shaped and correspond to the surface generated by a ¼ inch diameter right cylinder. In the preferred embodiment the hemispherical recesses are of ¼ inch diameter. These recesses are open to the interior of the yoke sleeve 60. The centers of the upper recesses as 65 and 65′ are all in the same horizontal plane. The centers of the lower recesses, as 66 and 66′ are all in one other horizontal plane 1 inch below the aforementioned horizontal plane for the upper recesses. Each flute, as 63 and 63′ is open for its full depth into each recess as its top, as 65 and 65′, and bottom, as 66 and 66′ for movement of balls from flute to recess and vice versa. The bottom of yoke sleeve 60 has a conical taper 67. The cylindrical portion 57 is provided with a pair of diametrically opposite support holes as 68, for a shear pin 74 and therebelow, a pair of diametrically opposite support holes, as 69 for a sturdy support pin 77 below described.

Hanger 52 is a sturdy T-shaped unit composed of a right cylindrical shaft portion 71 with a cylindrical head 72 thereon. In the preferred embodiment this hanger has a 5½ inch over-all length with shaft 71 having a 1 inch diameter and head 72 having a 1⅜ inch diameter and ½ inch height. The shaft portion 71 has a hole 73 therein, said hole being cylindrical and ¼ inch diameter in the preferred embodiment arranged horizontally i.e. normal to the longitudinal axis of the shaft 71. A shear pin 74 smoothly fits into this shear pin hole 73. Below this hole 73 is an elongated slot 76 (⅞ inch high, ⅜ inch wide in the preferred embodiment) for a sturdy support pin 77 (⅜ inch diameter in the preferred embodiment) below said shear pin hole 73. The laterally projecting annular portion of the top of the head 72 is referred to as shoulder 78 hereinbelow.

The locking sleeve 53 is composed of a hollow cylindrical sleeve skirt portion 80 and an annular collar 81 thereabove. In the preferred embodiment locking sleeve 53 has an overall length of 2½ inches, sleeve skirt portion 80 is ⅛ of an inch thick and the collar 81 is ¼ inch wide. The bottom portion of the inwardly projecting portion of collar 81 is referred to hereinbelow as shoulder 82. The sleeve skirt 80 has a plurality (12 in the preferred embodiment) of radially equispaced ball-retaining holes as 85, and 85′ each being conical in shape and the axis of the conical form being normal to the longitudinal axis of the locking sleeve 53; each such hole having an orifice at the inner surface of the skirt sleeve 80 with a diameter less than the diameter of the balls (¼ inch in the preferred embodiment) retained therein. The conical angle of the surface of each such hole is 30° in the preferred embodiment and permits a ¼ inch spherical ball to project 3/32 of an inch inward of the inner surface of the sleeve skirt 80. Pressure relief ports, as 86 and 86′, are also provided in the wall of sleeve skirt 80 above the ball retaining holes, as 85. The locking sleeve 53 is dimensioned to permit a sliding fit thereof with the inner surface 62 of the yoke sleeve 60 and with the exterior surface of the hanger head 72.

Figure 6:
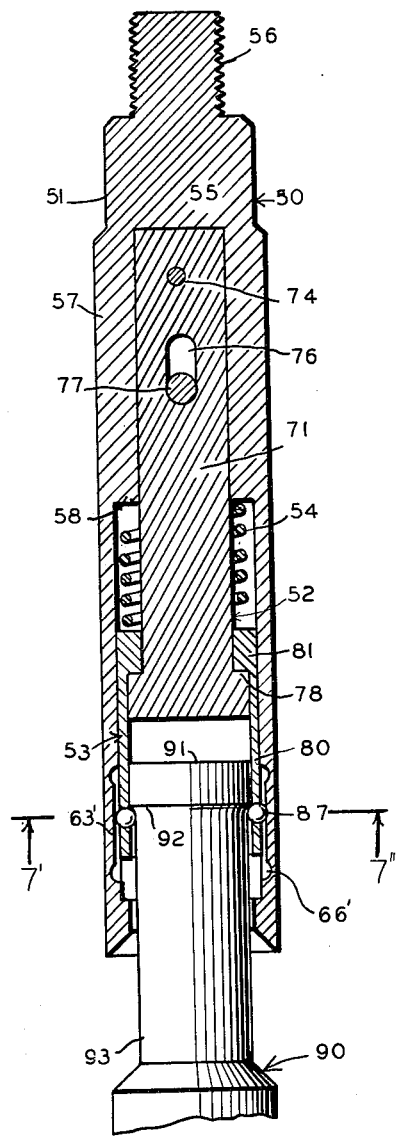
FIGURE 6 is a longitudinal cross-sectional view of the pulling and running tool of the device of FIGURE 1 locked to the fishing neck of the tool to be moved and in a supporting position for said latter tool.

In operative position the hanger 52, as shown in FIGURE 6, is held in place in yoke 51 by the shear pin 74 (or the pin 77) said pin ends each being supported in a hole, as 68, in portion 57 of the yoke 51 and said pins passing through the shaft 71.

A plurality of spherical metal locking balls as 87, 87′, 87″ are held respectively in the holes 85, 85′, 85″; the relative lateral position of these locking balls depends on the location of the locking sleeve 53 with respect to the yoke sleeve 60 of yoke 51 as described in detail below.

The tool shown generally as 90 has a conventional fishing neck 93. Such neck is provided with an enlarged head 91 and the shoulder or ridge 92 therebelow. This tool is moved by the pulling and running tool generally shown as 50 thereabove. The pulling and running tool 50 supports the tool 90 by its enlarged head 91, as shown in FIGURE 6.

In the operative position wherein the locking balls are locked in their place as shown in FIGURE 6 the vertical movement of the yoke 51 controls the vertical movement of the locking balls, as 87, which balls in turn support the head 91 of the tool 90.

This support is effected by that the shoulder 78 of the shaft 71 supports the shoulder 81 of the locking sleeve 53 and then the balls, as 87 and 87′, are then in a position in the flutes as 63 and 63′ whereat said balls project inwardly from the inner surface of the sleeve skirt portion 80; the outwardly projecting ridge 92 on head 91 of the tool 90 then rests on the inwardly projecting portion of said balls. The shear pin 74, supported on the yoke 51, supports the hanger 52.

A helical spring 54 winds around the shaft 71 of the hanger 52 and is compressed between shoulder 58 and collar 81. This spring urges the movable locking sleeve 53 downwardly to the limit of its travel permitted by the shear pin 74.

Figure 5:
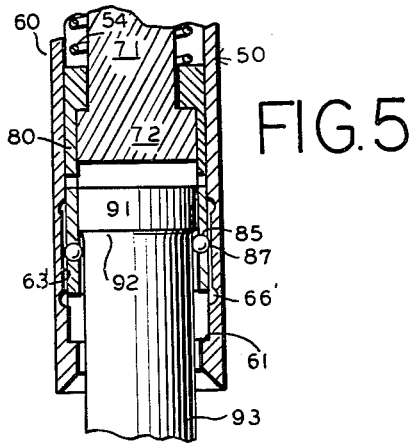
FIGURE 5 is a longitudinal cross-sectional view of portions of the devices of FIGURE 1 in a stage of joining of the devices of FIGURE 4 subsequent to that stage shown in FIGURE 4.

The locking balls as 87 and 87′ reach the operative position shown in FIGURE 6 by the sequence shown starting in FIGURE 1. In FIGURE 1 the to-be-pulled tool 90 is initially separated from and below the pulling and running tool 50. By a motion of the tool 50 toward tool 90, head 91 is moved within the inner movable locking sleeve 53. As shown in FIGURE 1 and FIGURE 2 this motion of head 91 forces the locking balls as 87 upwardly because the width of the cylindrical head 91 is larger than the space between the diametrically opposite locking balls as 87 and 87′ held in sleeve 80. The head 91 is thus unable to pass the locking balls 87 from the space below those balls when they are positioned as shown in FIGURE 1: Accordingly, the locking balls 87 are moved upwardly by the upward movement of the head 91 relative to the fixed outer yoke sleeve 60 due to yielding by spring 54, which spring is compressed by this relative motion of tool 90 and yoke 51. These locking balls move upward within flutes 63 as shown in FIGURE 2 until those balls reach the level of the upper recesses as 65 and 65′. Thereupon, as shown in FIGURE 2, as the recesses 65 and 65′, as 66 and 66′, provide lateral portions just deep enough to permit the balls to move sufficiently laterally for the head 91 of the tool 90 to slide past those balls while the balls are displaced into such recesses when the head thereupon forces the balls in to those recesses as shown in FIGURE 3. As soon as the head 91 passes the balls the force of the heretofore compressed spring 54 is released and urges the sleeve 53 and its skirt 80 and balls 87 carried therein downwardly as shown in FIGURE 4. The shoulder 82 of the locking sleeve 53 is thus moved downwardly relative to the yoke sleeve 60 and, as shown in FIGURE 4, the holes 85 pass below ridge 92. Release of the compression of spring 54 moves the yoke sleeve 80 and the cavities as 85, 85′ with the balls as 87 and 87′ therein over flutes as 63 and 63′, which flutes have less depth (laterally from the interior of sleeve skirt 80) than do recesses 65 and 65′; accordingly, the locking balls as 87 and 87′ are displaced inwardly, as shown in FIGURE 5. On motion of yoke 51 away from tool 90, as shown in FIGURE 6, laterally projecting ridge 92 rests on the inward projection of balls as 87 and 87′ and the shoulder 82 of collar 81 rests on shoulder 78 of shaft 71. The shaft 71 is then supported on the shear pin 74 which pin is supported on the thick cylindrical portion 57 of the yoke 51. Thereby, tension on the screw 56 of the cap 55 is transmitted by shaft 71 to its shoulder 78 and thence to the shoulder 82 of the locking sleeve 53 in the skirt portion 80 of which sleeve the locking balls as 87 are positioned and constrained from radial motion by the yoke sleeve 60; accordingly, said balls transmit tension to the ridge 92 of the head 91 and so support the tool 90 for upward motion. The flutes are just deep enough (about 1/16 of an inch) to permit this blocking and latching motion of the balls as 87 (which are about 1/4 inch in diameter in the preferred embodiment). The holes as 85, 85' and 85" in the sleeve skirt portion 80 permit the balls as 87 and 87' to project about 3/32 of an inch inward of the inner surface of the sleeve skirt portion 80 to achieve the locking position shown in FIGURES 5 and 6 whereby to transmit tension from the cap 55 to the head 91 of the tool 90.

Figure 8:
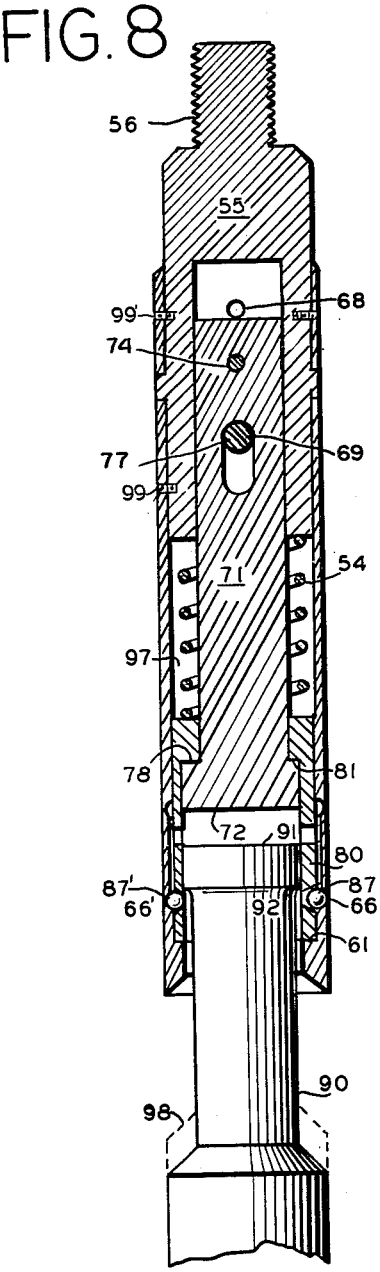
FIGURE 8 is a longitudinal cross-section view of the embodiment of the apparatus shown in FIGURE 6 during the initial stage of separation of the components thereof by a shearing-up action.
Figure 9:
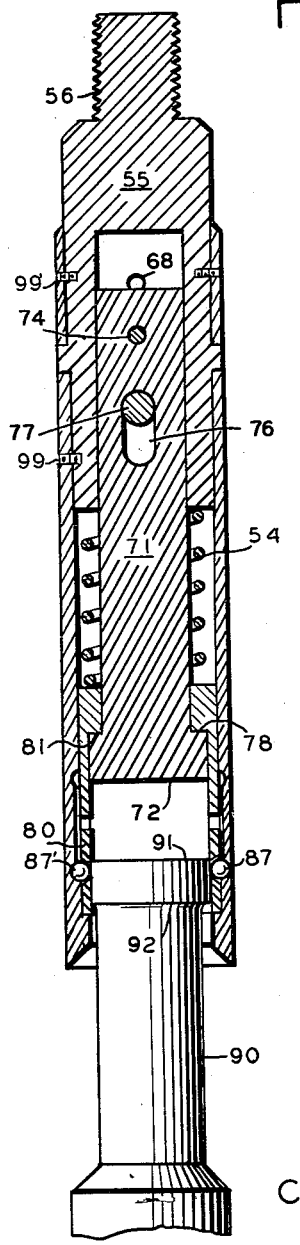
FIGURE 9 is a longitudinal cross-sectional view of the apparatus of FIGURE 8 in a stage subsequent to that there shown.

When release of the tool 90 is desired a sharp upward motion applied to the cap 55 causes the shear pin 74 to be broken. For this purpose the shear pin may be made of brass or tubing which may be broken at any predetermined stress from the known strength characteristics of that shear pin material. This permits the compression spring 54 to elongate and depress the shoulder 78. This causes the shaft 71 to drop the distance of the length of the slot 76. As shown in FIG. 8 the upper portion of the slot 76 rather than the lower portion thereof then rests on the strong support pin 77. This support pin 77 is sturdier than the shear pin 74 and does not shear under the stress of the afore-mentioned sharp upward motion which does rupture the shear pin. The movement of the shoulders 78 and 82 downward the length of the slot 76 relative to the fixed outer yoke sleeve 60 brings the bottom of sleeve skirt 80 to shoulder 61 and moves the locking ball-carrying recesses as 85 and 85' of the sleeve skirt 80 and the balls as 87 and 87' therein to the lower passing recesses as 66 and 66' respectively, which recesses, like 65 and 65; are just deep enough to permit the balls as 87 and 87' to move sufficiently laterally for the head 91 of the tool 90—previously supported on the inwardly projecting portion of said balls—to slide past those balls while the balls are displaced into such recesses. The balls are, of course, retained because the conical shape of the holes in which they are held in the sleeve skirt 80 limits their inward motion. There is not sufficient lateral space lateral of skirt 80 and interior of yoke sleeve 60 to lose the balls in that direction. The head 91 is then freely slidably past the balls as 87 and 87' and the tool 90 is thereby released from the pulling and running tool 50 on upward motion of that tool as shown in FIGURE 9. The above describes a "shear-up" disconnection of the tool 50 and the tool 90. While cylindrical balls, as 87, 87' and 87", are preferred as the rolling and locking elements between the movable sleeve 53 and the yoke sleeve 60, short cylinders of similar maximum diameters as the locking balls, as 87, 87' and 87", may, within the scope of this invention, be used as such rolling and locking elements. Such cylinders should have a length no greater than their diameter (1/4 inch in the device dimensioned as above-described) and the lateral ends of such cylinders should be bevelled for, preferably, 1/4 to 1/3 of the length of such cylinders, as shown at 88 in FIGURE 7—from each end of such cylinder—to provide for their free rolling.

Retaining holes in sleeve skirt 80 for these cylindrical locking elements as 88 are rectangular in section normal to the direction of motion of such cylindrical elements, and have a slightly greater depth than the locking element 88 diameter and a slightly greater length than the cylinder 88 length to permit these cylindrical locking elements to move centrally and laterally as above described for balls 87, 87' and 87". The thickness of sleeve skirt 80 relative to the diameter of the cylindrical locking elements would be the same as the diameter of locking balls as 87, 87' and 87" relative to the thickness of sleeve skirt 80, as above described.

The edges of retaining holes 85 adjacent sleeve skirt 60 would, also, be rectangular in shape, said rectangular edgs having a height slightly less than the diameter of the generally cylindrical rolling and locking elements, as 88, and such rectangular holes would be bevelled with their smaller edges on the inner surface of the sleeve skirt 80 in order to retain such cylindrical rolling and locking elements in place, yet permit the outward projection of such elements towards neck 93 and under ridge 92 sufficiently, as above described for the locking balls as 87, 87' and 87", to fix the position of the movable locking sleeve 53 with respect to the outer yoke sleeve 60.

Figure 7:
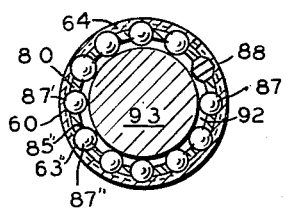
FIGURE 7 is a transverse cross-sectional view along the plane 7'—7" of FIGURE 6.

Also, within the scope of this invention, the flutes, as 63 and 63', may be substituted for by an enlarged annular space, shown as dotted line 64 in FIGURE 7, in place of such flutes, said annular space having the same depth as the flutes, as 63 and 63' and the top hemispherical recesses, as 65 and 65', may then be substituted for by a top annular recess at same vertical position and with same maximum diametral cross section as said top recesses and the bottom group of hemispherical recesses, as 66 and 66', may then be replaced by a bottom annular recess at the same position in yoke sleeve 60 and having the same maximum diametral cross section as said bottom group of recesses.

Figure 10:
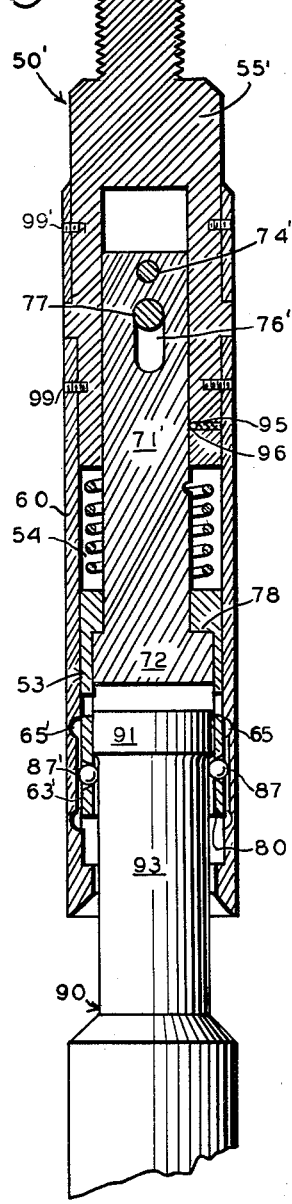
FIGURE 10 is a longitudinal cross-sectional view of a modification of the device of FIGURE 1 to achieve a shear-up separation of the components.
Figure 11:
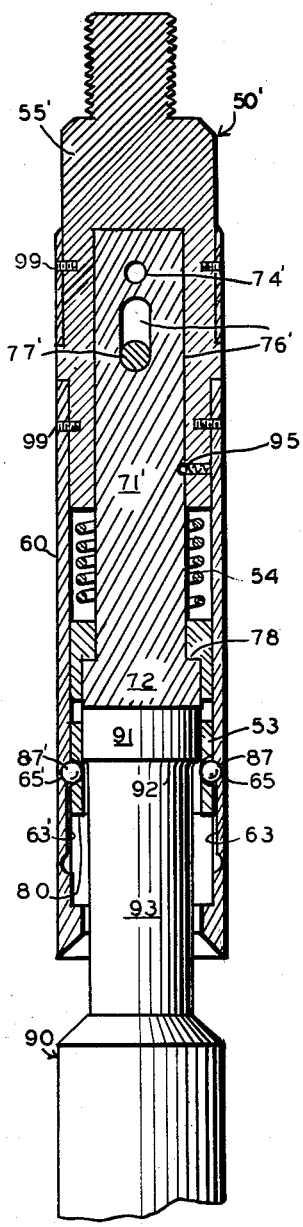
FIGURE 11 is a diagrammatic longitudinal cross-sectional view of the device of FIGURE 10 in a stage subsequent to that there shown during separation of the components of that assembly.

In an alternative embodiment of the device, shown in FIGURES 10 and 11, shearing-down is provided for as the means of separating the pulling and running tool 50' and the to-be-moved tool 90. In this embodiment the shaft 71 of hanger 52 of the embodiment shown in FIGURES 1–9 is modified so that its upper end is somewhat shortened and the support pin 77' is located at the top of the slot 76' in the operating position of the tool 50' as shown in FIGURE 10 when said tool is firmly connected to the tool 90 for movement of said tool 90, as up and down a well bore, by the movement of the pulling and running tool 50'.

The action of the components of tool 50' during the entry of the tool 90 into the sleeve 53 of this shear-down arrangement of the running and pulling tool 50' is the same as described for the device arranged to shear up as above described for FIGURES 1–7; however, there is a difference in operation which occurs only during the separation of the running and pulling tool 50' and the tool 90.

In such case, i.e., when the running and pulling tool 50' and the tool 90 are desired to be separated, a downward blow on the cap 55' shears the pin in the groove or slot 74'. Thereupon shoulder 78 pulls collar 81 upwardly; the spring 54 yields upwardly and the locking sleeve 53 moves upwards relative to the outer yoke sleeve 60 until the locking balls as 87 and 87' move from the position as shown in FIGURE 10 until such balls are at the same level as the upper passing recesses 65 and 65'. At that time, as shown in FIGURE 11, the locking balls as 87 are free to move laterally into such recesses. The head 91 is then moved downward; the angle of contact of the locking balls, as 87, with the bottom of the head 91 is such as to push those balls as 87 into the upper recesses, as 65, and permit the head 91 to slide downward thereby as in FIGURE 3. As shown in FIGURE 11 thereupon the tool 50' may be moved upward without further attachment to the tool 90, as does tool 50 in FIGURE 2. This permits the downward movement of head 91 of the tool 90 past the thus laterally moved balls somewhat as shown in FIGURE 2 but reverse in direction to the upward motion of tool 90 shown in FIGURES 2 and 3.

Following this upward motion of the hanger 52 within the yoke 51, it is fixed relative thereto by the spring 95 and detent 96, which hold the hanger 52 in its elevated position. This positioning of the shoulder 78 of the hanger 52 (which in turn holds the collar 81 of the sleeve 80) provides that the balls 87 cannot offer resistance to the motion of the head 91 thereby, as shown in FIGURE 11, notwithstanding the compression of spring 54 by the approximation of shoulder 58 to shoulder 78 resulting from the shearing-down action above described. Accordingly, the tool 90 is then readily downwardly moved from out of the sleeve skirt 80 and yoke sleeve 60 of the assembly 50'. Thereby the shear-down arrangement effects the separation of the pulling and running tool 50' from the set tool 90. Detent 96 is replaced in position when removed from the well and can be used again as shown in FIGS. 1–6. Screw 99 permits assembly of yoke sleeve 60 on yoke 51; screw 99' permits sleeve 116' removal for broken shear pin replacement.

Another embodiment of this invention in its locked tool-suporting position is shown in FIGURE 19. This pulling and running tool, generally shown as 100, comprises an elongated body 101, a movable outer sleeve 102, a movable inner sleeve 103, spring 150, balls 141–144 and a shear pin 119.

The body 101 comprises a cylindrical head 105 and a cylindrical upper shaft 106 concentric with but of less diameter than the head 105. The shaft 106 is fixed to the head 105. The upper shaft 106 is joined to a lower shaped shaft 107, which has an upper laterally projecting cylindrical shoulder 109. Shafts 106 and 107 are coaxial. The lower shaft 107—½ inch diameter in the preferred embodiment—is provided at its lower end with an upper annular, ring-shaped recess 110, and a lower annular ring-shaped recess 111 both having the same inner radius, which radii are drawn about the axial center of the cylindrical shaft 107. These ring-shaped recesses are joined by a cylindrical portion 112 which has smaller diameter than the shaft 107 but has a greater radius than the innermost radius of each of the upper and lower annular shaped recesses 110 and 111. The diameter of cylindrical portion 112 is ⅜ of an inch in the preferred embodiment while the inner radius of annular recess 110 (and 111) is only ¼ inch. The length of the cylindrical portion 112 is, in the preferred embodiment, ¾ of an inch from the equator of annular recess 111 to the equator of annular recess 110.

The head 105 has an upper male screw portion 115 for attachment of the tool 101 to equipment thereabove. Projecting laterally and below the body 105 is a fixed sleeve 116. A recess, 117, between sleeve 116 and shaft 106 provides for positioning therein of the tongue 120 of the movable outer sleeve 102.

The shaft 106 has a passage or cavity 118 therethrough for a shear pin 119, below described.

The movable sleeve 102 has an outer periphery coplanar with the periphery of fixed cylindrical sleeve 116. Movable sleeve 102 is composed of a cylindrical barrel or tube 121 the outer periphery of which matches the outer peripheral surface of sleeve 116 above described. The upper portion of the barrel 121 is reduced in external diameter to form the tongue 120 projecting upward into the space 117. The lower end of the barrel 121 is provided with an inwardly projecting annular ridge 122 which provides at its top a lower shoulder 123. In the preferred embodiment the outer diameter of the movable sleeve 102 is 1¼ inches and its inner diameter at 127 is 1 inch.

The sleeve 102 is provided with an upper shoulder 125 between the upper, thicker portion, 126, of the barrel or tube 121 and the lower, thinner, portion, 127, of barrel or tube 121. The movable sleeve 102 slidably fits on the upper shaft portion 106 with the interior surface of thick portion 126 of the barrel 121 of the sleeve 102 slidably fitting on the exterior of the upper thicker portion 106 of the body 101 while the lower thinner portion 127 of barrel 121 is concentric to the upper portion of lower shaft 107; the annular space therebetween is occupied by spring 150 and movable inner sleeve 103. The upper shoulder 125 is either slightly above or in direct contact with the shoulder, 109, depending on whether or not the pin 119 is sheared. The tubular portion 126 is provided with a pair of holes as 129 diametrically opposite each other in the wall of tube 126 for support thereof by the shear pin 119.

Assembly screws as 128 and 128' in the preferred embodiment facilitate the attachment of the thin annular portion 127 of movable sleeve 102 to the upper portion 126.

The movable inner sleeve 103 is composed of a hollow cylindrical tube portion 133 (3½ inches overall length and ½" I.D., ¾" O.D. in the preferred embodiment), an annular collar 135 of rectangular cross-section and of slightly greater external width (1.0 inch outside diameter in the preferred embodiment), and a plurality of holes as 136, 137, 138, 139 for carrying a plurality of locking balls as 141, 142, 143, 144, respectively, in the preferred embodiment. There are four such holes provided in the preferred embodiment illustrated in the Figures; each such hole is conically shaped with the apex of the cone directed outwardly along a diameter of tube 133. The conical angle is 30° i.e. a conical generation of 15° from the horizontal axis about which the conical surface is generated (which surface forms the shape of each such hole). The outer diameter of each such hole is slightly less than the diameter of the locking balls used in this device; accordingly, a ¼ inch diameter locking ball as 141 laterally projects 3/32 of an inch from sleeve 133. The bottom 145 of the sleeve 103 is beveled conically as shown at edge 146. The sleeve 103 is positioned about the shaft 107 with the interior surface of the cylindrical tube portion 133 slidably fitting on the shaft 107.

A helical spring 150 is located and compressed between shoulder 109 and collar 135 and winds around shaft 107, thereby urging the sleeve 103 downwardly from the position of shoulder 109.

The tool to-be-removed by the above described pulling and running tool 100 is shown generally as 151. Tool 151 is provided with an inner sleeve 152. This inner sleeve has an annular collar 153 with an inner diameter such that it slidably fits over the outside diameter of the tube 133. A bevelled (with ¼ inch diameter bevel in the preferred embodiment) ridge 155 at the bottom of the collar 153 provides for a ¼ inch difference in diameter from the inside of collar 153 to the inner wall of the sleeve 152.

In FIGURE 19 the tool 100 is shown locked to and supporting the tool 151; the locking balls as 141 through 144 are so positioned in the running tool as to firmly lodge under the ridge 153. These balls are supported in the holes 136 to 139 of the sleeve 133. These holes are bevelled conically with the apex of the cone of said conical shape exterior the sleeve 133 to provide, as above described, for a lateral projection of the balls (¼ inch diameter balls in the preferred embodiment) which provides for the locking engagement of said balls with the ridge 155 of the shoulder 153 as shown in FIGURE 19. The balls in this operative position are located against the recessed portion 112 on the shaft 107. Cap 105 is connected by the shear pin 119 to the outer barrel or tube 121; this barrel 121 slidably fits over the shaft 106 and its ridge 125 projects inwardly to cooperate as below described with the outwardly projecting shoulder 109 on the shaft 106. The compressed spring 150 below the bottom surface of shoulder 109 presses downwardly on the top collar 135 of the sleeve 133 and brings shoulders 123 and collar 135 in contact together.

The locking balls, 141 to 144, are constrained to stay in position lateral to the cylindrical portion 112 by the fixed location of the sleeve 133 and holes 136 thru 139 therein. These holes are kept in locking position relative to portion 112 of shaft 107 by the location of the collar 135 of the sleeve 103 on the shoulder 123 of collar 122 of the sleeve 102, which latter sleeve is fixed by the shear pin 119 to the shaft 106.

The running and pulling tool 100 is brought to the cooperative relationship with the to-be-moved tool 151 shown in FIGURE 19 by the sequence of motions of the components of tool 100 shown in FIGURES 12 through 19 and below described.

Figure 12:
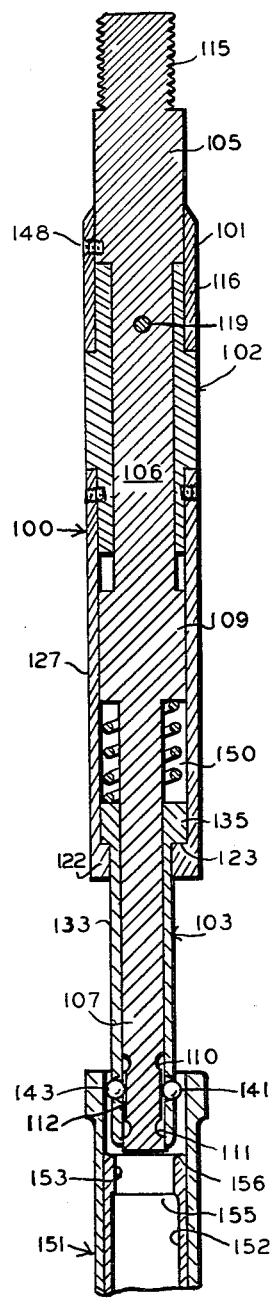
FIGURE 12 is a longitudinal cross-sectional view of another embodiment of this invention during the initial stage of approximation of the pulling and running tool with the fishing neck of a tool to be moved thereby.
Figure 13:
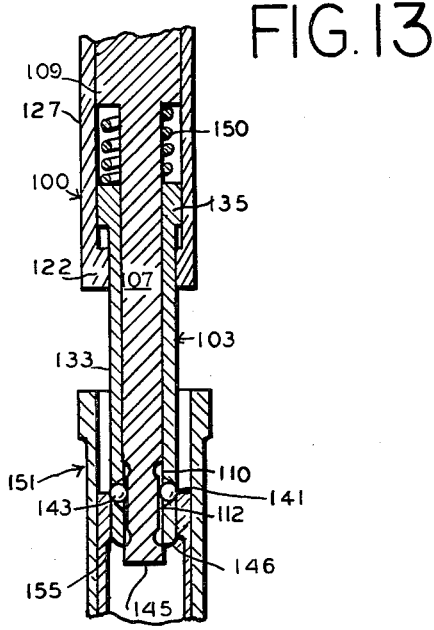
FIGURE 13 is a diagrammatic longitudinal cross-sectional view of portions of the devices of FIGURE 12 in a stage subsequent to that shown in FIGURE 12.
Figure 14:
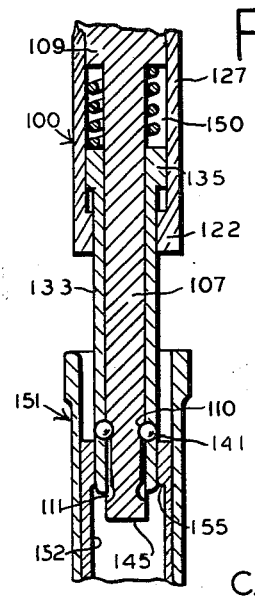
FIGURE 14 is a diagrammatic longitudinal cross-sectional view of portions of the devices of FIGURE 12 in a stage subsequent to that shown in FIGURE 13.

On downward motion of the pulling and running tool 100 towards the tool 151 to be moved, the bottom of the sleeve 103, which is beveled, passes into the top, also beveled, portion 156, of the collar 153 as shown in FIGURE 12. As shown in FIGURE 13, the collar 153 contacts the locking balls as 141, 142, 143, 144 and presses said balls upwardly. The collar 153 has a narrow orifice which does not permit passage of the balls when they are in their position shown in FIGURE 12 because of the projection of those balls beyond the lateral surface of sleeve 133, which sleeve fits slidably yet smoothly into the orifice of (shoulder or) collar 153. Accordingly, downward motion of those balls is initially resisted by the spring 150; this spring, however, being resilient, yields as shown in FIGURES 13 and 14 and, accordingly, on continued motion of the tool 100 the locking balls 141-144 are displaced upwardly while within their sleeve 133 which sleeve also, correspondingly, moves upwardly while compressing the spring 150. Thereby, as shown in FIGURE 14, the locking balls 141-144 are raised to the level of the upper annular recess 110.

Figure 15:
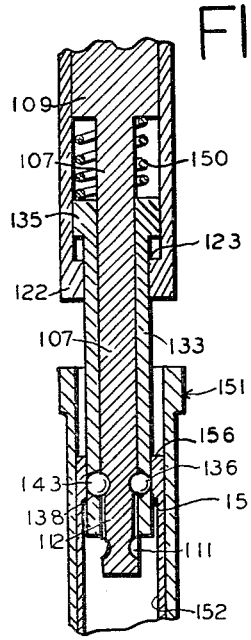
FIGURE 15 is a diagrammatic cross-sectional longitudinal view of portions of the device of FIGURE 12 in a stage subsequent to that shown in FIGURE 14.
Figure 16:
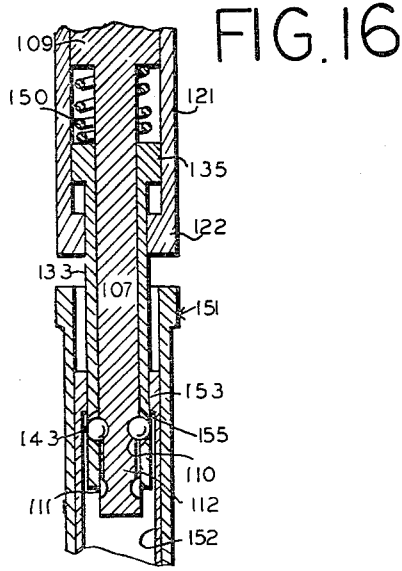
FIGURE 16 is a diagrammatic longitudinal cross-sectional view of portions of the devices of FIGURE 12 in a stage subsequent to that shown in FIGURE 15.

The presence of this recess adjacent the locking balls and the medial urging of these spherical balls by their lateral contact with the inner portion of the upper surface of the (shoulder or) collar 153 results in that the balls move medially into that annular recess. Thereby the previous lateral projection of the locking balls 141-144 from the continuation of the geometrical surface continuous with the outer surface of the tube 133 is removed; this permits passage of the bottom of the shaft 107 through the collar 153 as shown in FIGURE 15. FIGURE 15 shows the position of the balls in their nonprojecting position passing through collar 153 while the spring 150 is still under compression. The balls thus pass to below ridge 155, as shown in FIGURE 16, whereupon the compression of spring 150 is released completely.

Figure 17:
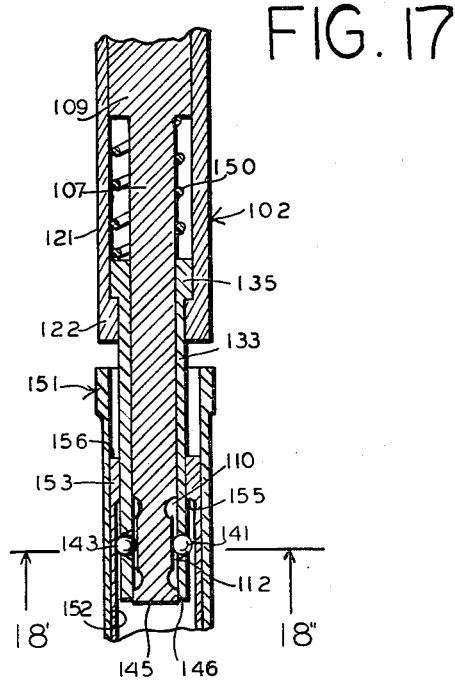
FIGURE 17 is a diagrammatic longitudinal cross-sectional view of portions of the devices of FIGURE 12 in a stage subsequent to and following that of FIGURE 16.
Figure 18:
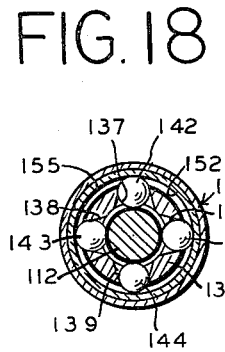
FIGURE 18 is a transverse cross-sectional view along the plane 18'—18" of FIGURE 17.

As shown in FIGURE 17, as no compressive force is then further exerted against the spring 150, the spring 150 decompresses and expands and moves the collar 135 again into contact with lower shoulder 123 of the sleeve 102. When the spring decompresses, the sleeve 103 moves downward and causes the locking balls, as 141, 142, 143, and 144, to move outwardly from their hollow, recessed position in upper annular recess 110 to their laterally projecting position in the outer surface of cylindrical portion 112. The balls are then held in relative vertical position on portion 112 in and by the movable sleeve 103 between portion 112 of the shaft and the inner surface of sleeve 152 of the tool 151 below the ridge 155. The walls of the cylindrical portion 112 constrains the locking balls from moving inwards. Accordingly, the locking balls, as 141, 142, 143, and 144, then project outwardly from the outer surface of the sleeve 103 sufficiently to lock under the ridge 155 as shown in FIGURES 18 and 19.

On motion upward of the shaft 101 to the position shown in FIGURE 19, the locking balls, as 141, 142, 143, and 144, project laterally from the periphery of sleeve 103 and lodge under and support the ridge 155 of collar 153 as shown in FIGURE 12. Tension on screw thread 115 thereby passes by shear pin 119 through tube 102 to shoulder 123 and then to collar 135 of tube 103 which supports vertically the locking balls, as 141, 142, 143, and 144, which in turn support the ridge 155 of the collar 153 of the to-be-moved tool 151.

To release the pulling and running tool 100 from the tool 151 a sharp upward motion on the tool head 105 shears the pin 119; the sleeve 102 is then urged downwardly by the release of pressure of the compressed spring 150 against the fixed shoulder 109, through collar 135, on shoulder 123 of collar 122 of the tube 102. This provides a movement downward of sleeve 103 relative to the shaft 107 from the position shown in FIGURE 19 to the position shown in FIGURE 20. The distance between the top of shoulder 109 and the bottom of upper shoulder 125 are chosen to be, in the position shown in FIGURE 19, the same distance as the distance between the locking position of balls, as 141, 142, 143, and 144, as shown in FIGURE 19 and the equator of lower annular recess 111. Accordingly, this controlled release of the structure holding the sleeve 103 in locking position and action of spring 150 moves that sleeve downwardly as allowed by shoulders 109 and 125 until the ball retaining holes as 136, 137, 138 and 139 are opposite the lower annular recess 111 as shown in FIGURE 20. Thereupon the locking balls may move into that recess 111, which recess has a sufficient depth so that when said balls pass into said recess, they then no longer project outwardly beyond the outer surface of tube 133.

In this position of parts the cap 105 is firmly attached to the shaft 106, the upper part of shoulder 109 of which supports the shoulder 125 of sleeve 102 whereby tension is transferred through the lower cylindrical walls 127 through collar 123 to collar 135 and thence to tube 133. The balls, as 141, 142, 143, and 144, are retained in the annular recess 11 and, as shown in FIGURE 21, do not project past the surface of tube 133 while said tube is drawn through the collar 153 and the pulling and running tool 100 is thus separated from the tool 151. The balls, as 141, 142, 143, and 144, do not escape from tube 133 because the outer orifice of each of holes 136, 137, 138, and 139 is smaller than the largest diameter of the balls, as 141, 142, 143, and 144 located therein. Accordingly the balls are retained there during movement of the entire tool 100 to the surface. There screw 148 is loosened and the sleeve 116 is slid upwardly along head 105. The sleeve 102 is replaced in operative position so that the tongue 120 reaches to the top of the shaft 106; and the broken shear pin 119 is replaced by a new one, which new pin is slid into holes as 118, and each of pair of holes as 129 for further use in recovering tools as 151 as desired. The screw 148 and sleeve 116 are then replaced as shown in FIGURE 12. The top of sleeve 116 is bevelled as at 157 to minimize undesirable catching of this projecting sleeve during the movement of said tool in the well hole in which it is used.

According to this invention there is provided a system of moving downwell tools and rearranging the components thereof for location or other action of said tools at any desired position in the well tubing.

Figure 23:
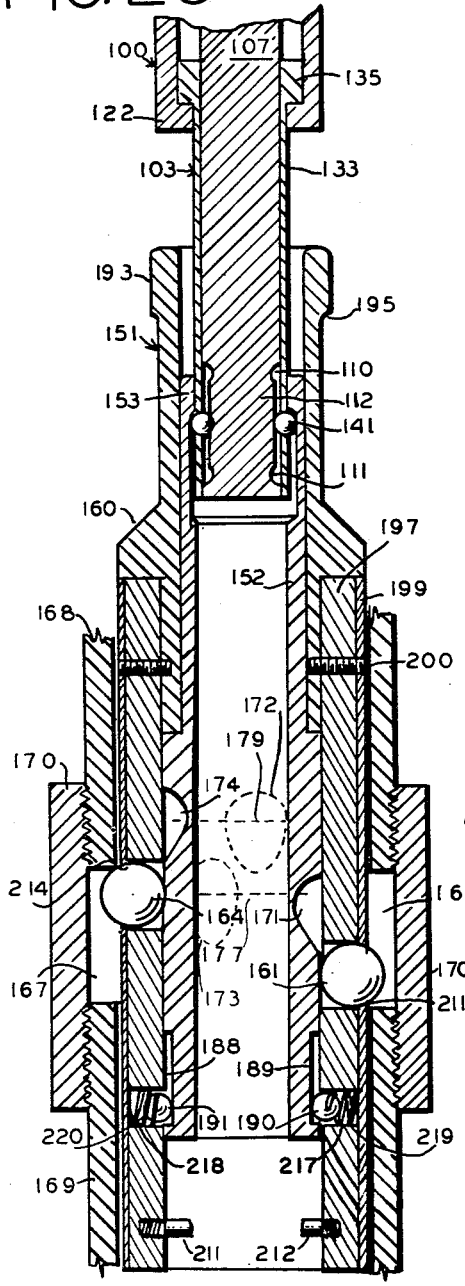
FIGURE 23 shows the collar stop modification of FIGURE 22 with a running tool as in FIGURE 12 located therein, the components of the collar stop having been moved by the running tool to bring such collar stop to its fixed position.
Figure 24:
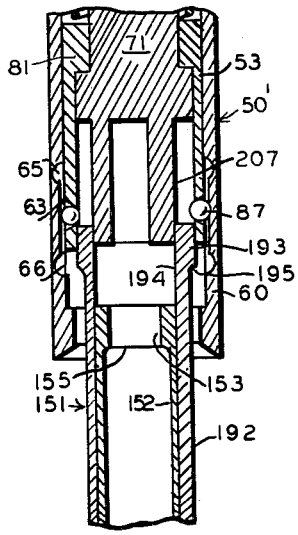
FIGURE 24 shows the collar stop of FIGURE 22 with a pulling and running tool modification generally according to FIGURE 1 of this invention in initial contact therewith.
Figure 28:
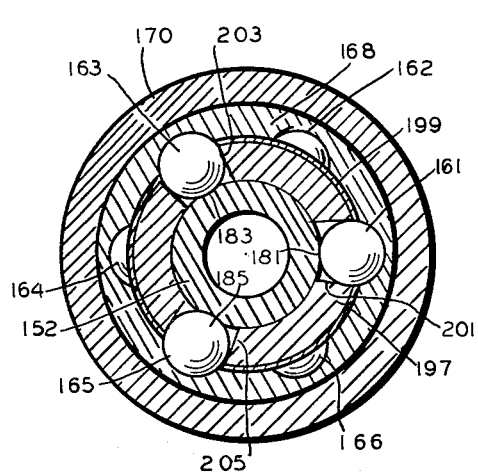
FIGURE 28 is a transverse cross-sectional view along plane 28'—28" of FIGURE 25.
Figure 25:
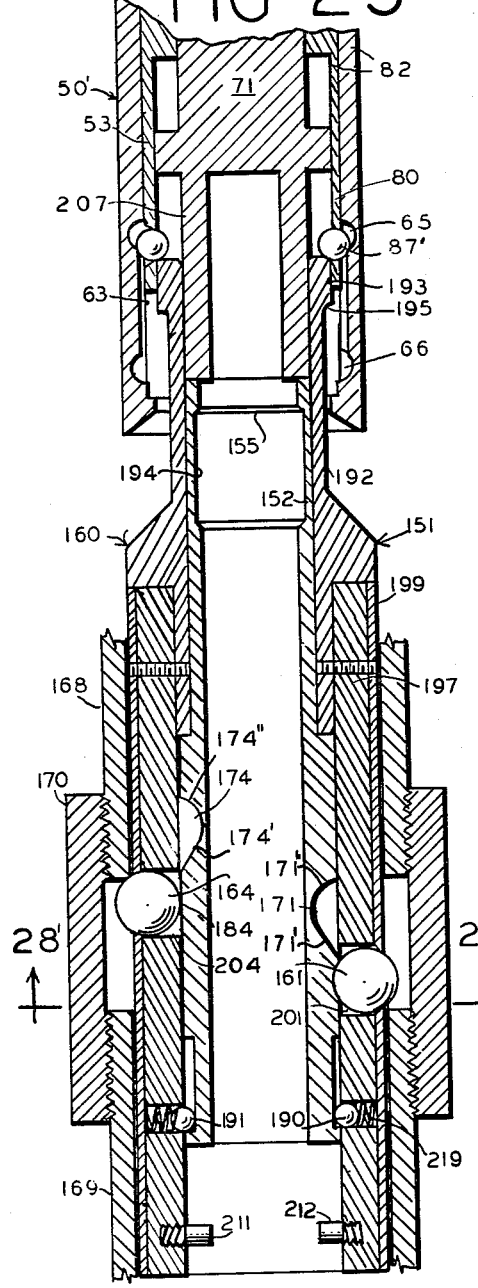
FIGURE 25 is an overall central longitudinal sectional view showing the collar stop of FIGURE 22 in its fixed position as shown in FIGURE 23 with the pulling and running tool of FIGURE 24 in somewhat more advanced stage of joining therewith than in FIGURE 24.

FIGURES 22 through 29 show a collar stop 151 included within this invention adapted to be moved with the pulling and running tools of this invention. The collar stop tool, generally shown as 151, is comprised of an inner shaped sleeve 152 and an outer compound sleeve 160. The outer compound sleeve 160 comprises a series of locking balls, as 161, 162, 163, 164, 165, and 166 arranged about the periphery of said sleeve 160. In the fixed operative position of this tool, as shown in FIGURES 23, 25, and 28, the locking balls project in part into the annular space 167 between upper casing tubing 168 and a lower casing tube 169, this space 167 being laterally circumscribed by the conventional well casing coupling 170.

Figure 22:
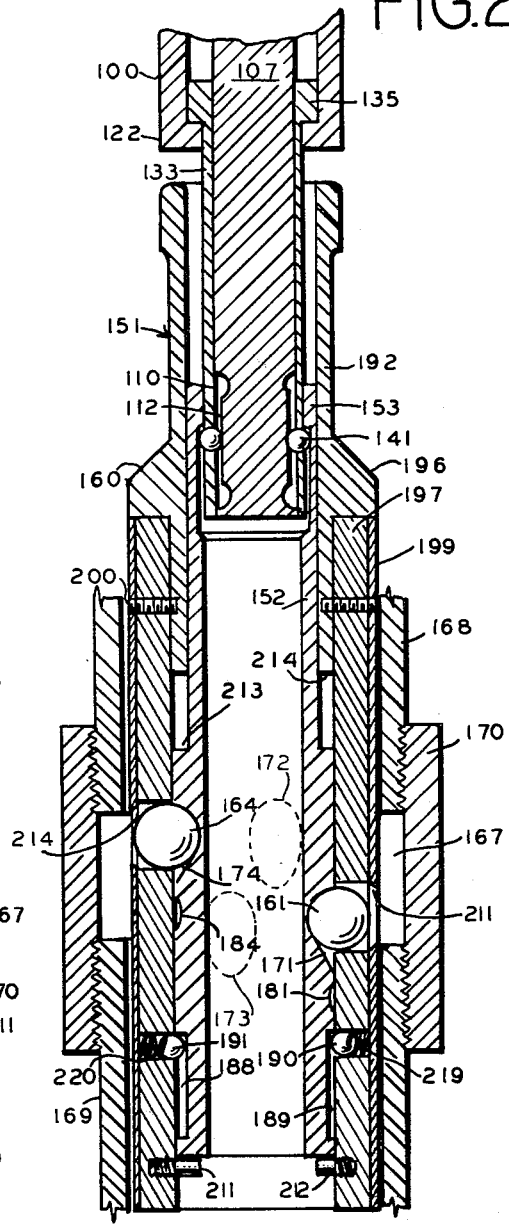
FIGURE 22 shows a modification of apparatus included within this invention, a collar stop, said collar stop being in its movable position with a running tool as in FIGURE 12 therein about to move said collar stop from its movable to its fixed orientation.
Figure 29:
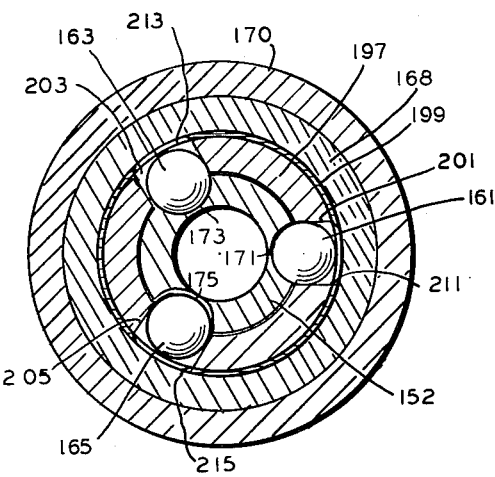
FIGURE 29 is a transverse cross-sectional view along plane 29'—29" of FIGURE 27.

The movable sleeve 152 is provided with a lower portion. The lower portion of sleeve 152 is provided on its outside surface with a plurality of cylindrical recesses 171 through 176 for each of the locking balls 161 through 166, respectively. These recesses are spherical on top, cylindrical therebelow and are arranged, in the preferred embodiment, in two rows, 177 and 179, each row having three such recesses therein. Additionally another set of six smaller recesses 181 through 186 (181 and 184 shown) are provided for each of the balls 161 through 166, respectively. The larger recesses are of sufficient depths to provide for such medial movement of the locking balls thereinto as to remove projections of said locking balls from any position lateral to the periphery of the outer tube 160, as shown in FIGURES 22 and 29. The smaller recesses 181 through 186 are merely dimples to locate the balls as 161 through 166 positively in positions as hereinafter described. These dimples are located in two lines, one below each of lines 179 and 177, for the corresponding balls 161 through 166. The lower section of the tube 152 is also provided with a plurality of grooves as 188 and 189, which, in cooperation with the balls 190 and 191, respectively, maintain the position of the inner sleeve 152 with respect to the outer sleeve 160.

The outer sleeve 160 comprises a fishing neck 192 provided with an annular head 193 of somewhat greater external diameter than the cylindrical neck 192. A ridge 195 is located between said neck 192 and said enlarged head 193. Ridge 195 is beveled to fit a ¼ inch diameter ball, as below described. The cylindrical portion 194 enlarges in a conical manner at 196. Projecting therebelow is an annular inner wall 197 and an outer cylindrical locking plate 199 firmly fitting thereon. The wall 197 has therein orifices 201 through 206 of slightly more than the diameter of the balls 161 through 166 carried therein: the holes are cylindrical in section and permit the balls to move freely along the passageway provided by each such orifices. The outer locking plate 199 has therein orifices 211 through 216 (211, 213, 214, 216 shown) for, respectively, each of the corresponding balls 161 through 166. These orifices are all of lesser diameter than the corresponding balls, as 161, 162, 163, 164, 165, and 166 (½ inch in diameter in the preferred embodiment) and there by prevent such balls from escaping laterally out of the sleeve 160. The sleeve 197 is also provided with a plurality of orifices 217 and 218 wherein to locate the spring 219 and 220, respectively, for the locking balls 190 and 191 above described. Additionally, there are provided in the inner sleeve 197 locking studs 211 and 212 to limit the motion of the sleeve 152. Sleeve 152 is provided with a shoulder 213 which matches with the shoulder 214 of the tube 160 which limits the upper movement of said sleeve 152. The outer diameter of the tube 160 is the conventional 1⅞ inches in order to readily fit inside of the conventional 2 inch inside diameter tubing 168 and 169. Screws, as 200, hold wall 179 and plate 199 on neck 192.

FIGURE 22 shows the components of collar stop tool 151 in the movable position of that tool and the running tool 100 is shown in FIGURE 22 in its locked tool supporting position and orientation of its (tool 100) parts. Tool 100 is then adapted to move the collar stop tool 151 from one position to another within the well as the balls 141 through 144 then support the ridge 155 of the collar 153 of the sleeve 152 of the tool 151, as above described.

A relatively sharp motion upward of the tool 100 moves the sleeve 152 upward. Thereby the locking balls 161 through 166 are displaced laterally by the downwardly and outwardly sloped bottom portions 171' through 176' of the recesses 171 through 176, respectively, from their prior positions in the spherical deeper portions 171" through 176" (171" and 174" shown) respectively of said recesses and project into the recess 167 as shown in FIGURES 23 and 28. This fixes the position of the tool 151 relative to tubes 168 and 169. The dimpled portions 191 through 196 on sleeve 152 then aid in locating the locking balls in the position thus determined by the movement of the inner sleeve 152. Springs 219 and 220 and friction balls 190 and 191 aid in securing the location of the sleeve 152 with respect to the outer sleeve 160 and so fix the projecting location of the lateral portions of locking balls as 161 through 166. Rupture of the shear pin of the pulling and running tool 50, as above described permits the locking balls to escape from within their locking positions below ridge 155 of collar 153 as shown in FIGURES 19, 20, and 21 above and thus, simply and controllably, leave the tool 151 located downwell at such level as is desired.

Figure 26:
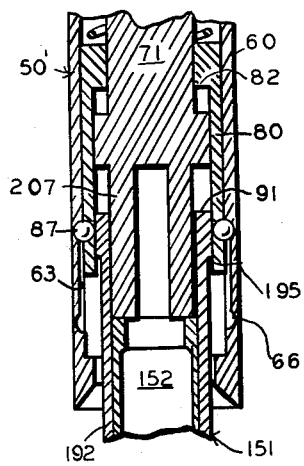
FIGURE 26 shows a portion of the collar stop and running and pulling tool of FIGURE 25 in a somewhat more advanced stage of joining therewith than in FIGURE 25.
Figure 27:
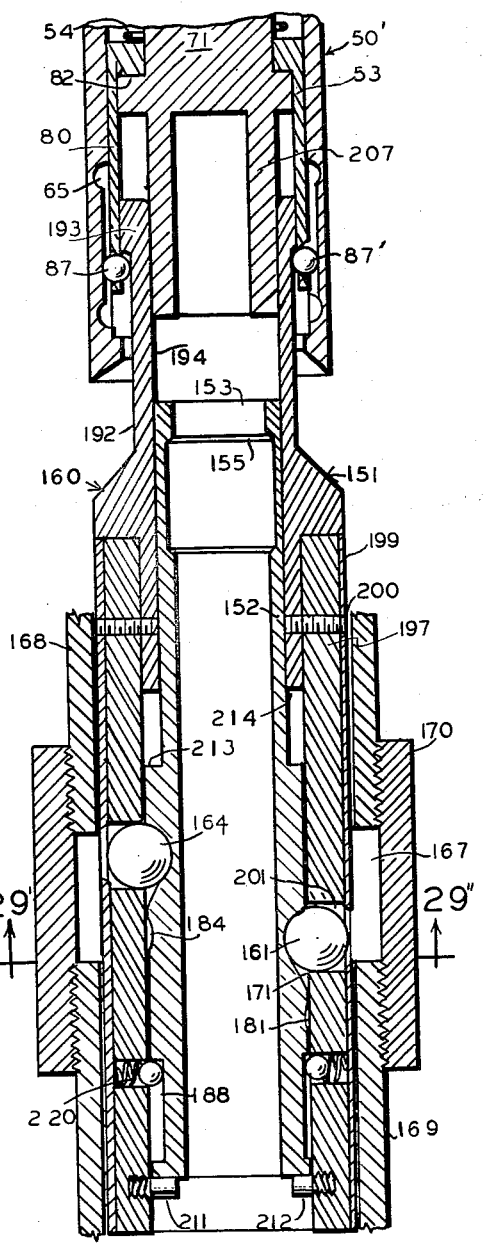
FIGURE 27 shows the collar stop of FIGURE 25 in its running position with the pulling tool attached to and supporting said collar stop.

FIGURE 25 shows the collar stop tool 151 located in a well between tubing sections 168 and 169 in its fixed position as left by the operation described for FIGURE 23. Initial contact of tool 151 with a running and pulling tool 50' is shown in FIGURE 24. Tool 50' is generally composed and arranged as in the device of FIGURES 1 through 11 with the modification that the shaft 71 is provided at its lower surface with a cylindrical tongue 207 which has an outside diameter only slightly less than the inner diameter of cylinder portion 194 of the fishing neck 192. This tongue extends downwardly through the orifice in neck 192 to contact and move the collar 153 of tool 151 in the sequence shown in FIGURES 24, 25, and 26 to actuate the mechanism in tool 151. As shown in FIGURE 25, the locking balls, as 87 and 87' of the pulling and running tool 50' are pushed upwardly at the position of initial contact of tool 50' and 151 (shown in FIGURE 24) towards and into the recesses 65 as above described for FIGURES 1 and 2. On further downward motion of the pulling and running tool 50' relative to the collar stop tool 151 from the position shown in FIGURE 25, the tongue 207 projects further into the interior 194 of the fishing neck 192 and then presses the movable sleeve 152 downward as shown in FIGURE 25 and FIGURE 26. Further downward motion of the tool 51 as in FIGURE 26 causes the locking balls as 87 and 87' to pass laterally of head 193 as described above in regard to FIGURE 3 and tongue 207 to urge sleeve 152 further downwardly to the position shown in FIGURE 27. At that position the locking balls 161 through 166 pass to the deeper spherical portions as 171" through 176" of recesses 171 through 176, respectively, and, thereby, the lateral projections of balls 161 through 166 beyond the surface of tube 197 are withdrawn. FIGURE 27 shows the position of the parts of the collar stop tool in its arrangement for moving up and down the well. This structure and sequence of operations permit the tool 151 or other tool with similar fishing neck to be returned to the surface while locking balls as 87 and 87' hold the outer lip of the tool for upward movement thereof. The spherical portion of each recess, as 174", has the same radius as the cylindrical portion, as 174', of such recess and is tangent thereto; the cylindrical portion extends from the sleeve surface at an angle thereto of 30° in the preferred embodiment to provide a smooth passageway for the balls in and out of each recess.

Thus, according to this invention there is provided a fishing neck system for tools as collar stop 151 to be let downwell, and recovered and controlled therefrom by running and pulling tools as 50 and 100. Also according to this invention, well tools provided with the fishing neck shown on the collar stop 151 may be put into position by pulling and running tools as 50 and 100, and, once brought to its desired position—and there located as in the preferred embodiment—the internal configuration of the thus-positioned tool may be changed as desired by manipulation, such as by shear of the shear pin of the running and pulling tool.

Also, according to this invention as above described there are provided not only particular pulling and running tools as 50 and 100 and a downwell tool as 151 but also a system of moving downwell tools and rearranging the components thereof for location or other action of said tools as desired in the well tubing.

The locking spherical balls, 161 through 166, may be replaced within the scope of this invention by short cylinders as items 88 above described for tool 50. Recess 171 through 176 would then be cylindrical rather than spherical at their top 171"—176" and flat or bevelled below at 171'—176' to fit the longitudinal cross section of such cylindrical movable locking elements and permit their movement to locked and unlocked position; the holes 201 through 206 would then be rectangular in cross-section (section taken therethrough transverse to the planes shown in both FIGURES 27 and 29) and edges as 211 through 216 would be bevelled to permit projection of the rollable locking elements as shown in FIGURES 27 and 23, as above described for the tool 50.

Having thus described preferred embodiments of the means by which the objects of the invention are obtained, modifications thereof within the skill of the art are intended to be included within the scope of the appended claims.

I claim:

1. A well tool combination comprising a first well tool and a second well tool releasably attached to one another, the first well tool comprising a first elongated member, a second hollow member elongated in the same direction as said first member and movable with respect to said first member and slidably attached thereto, said second member having therein a series of holes passing therethrough in a plane normal to the direction of elongation of said second member, a locking member having a diameter movably located at least in part within each of said holes, one end of each of said holes being smaller than the diameter of the locking member therein whereby each of said locking means will not entirely pass through and out of the hole in said sleeve in the direction of said one end, the other end of each said hole being open towards said first member, and said locking member movable therethrough, said first member having a pair of vertically spaced apart depressions in the surface, said depressions matching, in the vertical cross-section thereof, the corresponding cross-section of said locking members, said depressions each having a depth that is, in combination with the holes in said second member, as deep as the thickness of each said locking member, and said first member also having, adjacent to and continuous with said depressions, a recess which, in combination with the holes passing through said second member, has a depth less than the thickness of said locking means, said locking means being, in the attached position of said first tool and second well tool, located in part within said holes therefor and in part projecting therefrom and in contact with said recess and said second tool, said second well tool having a head which slidably fits said second member of said first tool, and said head having immediately therebelow an extension thereof of different width and joined thereto by a shoulder, said locking means fitting below and supporting said shoulder.

2. A well tool combination comprising a first well tool and a second well tool releasably attached to one another, the first well tool comprising a first elongated cylindrical member, a second hollow member elongated in the same direction as said first member movable with respect to said first member and slidably attached thereto, said second member having therein a series of holes passing therethrough in a plane normal to the direction of elongation of said second member, a locking member having a diameter and of cylindrical section as viewed in a vertical plane movably located at least in part within each of said holes, one end of each of said holes being smaller than the diameter of said locking member therein, whereby each of said locking means will not entirely pass through and out of the hole in said sleeve in the direction of said one end, the other end of each said hole being open towards said first member and said locking member movable therethrough, said first member having a pair of vertically spaced apart annular depressions in its surface, said depressions matching in the vertical cross-section thereof the corresponding cross-section of said locking members, said depressions each having a depth that is, in combination with the holes in said second member, as deep as the thickness of each said locking member, and said first member also having, adjacent to and continuous with said depressions a recess which, in combination with the holes passing through said second member, has a depth less than the thickness of said locking means, said locking means being, in the attached position of said first and second well tools, located in part within said holes therefor and in part projecting therefrom and in contact with said recess and said second well tool, a shoulder on said first member, a shoulder on said second member, an elastic compression member between said shoulders urging said shoulders away from each other, a third member held in place relative to said first member by frangible means attached to said first member, means on said first member additional to said frangible means limiting the movement of said first member relative to said second member on rupture of said frangible means, one of the depressions in said first member then being adjacent said holes in said second member whereby each locking member then passes into said one of said depressions and the projection of the locking member of the first tool therefrom is reduced, said second well tool having a head of cylindrical outline which slidably fits said second member of said first tool and said head having immediately therebelow an extension thereof of different width and joined thereto by a shoulder, the projecting part of said locking means fitting below and supporting said shoulder, the height of said head being less than the vertical distance between said annular depressions.

3. A well tool comprising a first elongated member, a second hollow member elongated in the same direction as said first member, movable with respect to said first member and slidably attached thereto, said second member having therein a plurality of holes passing therethrough in a plane normal to the direction of elongation of said second member, a locking member having a diameter movably located at least in part within each of said holes, one end of each of said holes being smaller than the diameter of said locking member therein whereby each of said locking means will not entirely pass through and out of the hole in said sleeve in the direction of said one end, the other end of each said hole being open towards said first member, said locking member being movable therethrough, said first member having a pair of vertically spaced apart depressions in its surface, said depressions matching in their vertical cross-section the corresponding cross-sections of said locking members, said depressions each having a depth that is, in combination with the holes in said second member, as deep as the thickness of each said locking member, and said first member also providing, adjacent to and continuous with said depressions, a recess which, in combination with the holes passing through said second member, has a depth less than the thickness of said locking means, said locking means being, in the attached position of said first well tool and a second well tool, located in part within said holes therefor and in contact with said recess and, in part, projecting from said holes.

4. A well tool comprising a first elongated cylindrical member, a second hollow member elongated in the same direction as said first member, movable with respect to said first member and slidably attached thereto, said second member having therein a series of holes passing therethrough in a plane normal to the direction of elongation of said second member, a locking member having a diameter of cylindrical cross-section as viewed in a vertical plane movably positioned at least in part within each of said holes, one end of each of said holes being smaller than the diameter of said locking member therein, whereby each of said locking means will not entirely pass through and out of the hole in said sleeve in the direction of said one end, the other end of each of said holes being open towards said first member, said locking member being movable therethrough, said first member having a pair of vertically spaced apart annularly arranged depressions in its surface, said depressions matching in their vertical cross-section the corresponding cross-sections of said locking members, said depressions each having a depth that is, in combination with the holes in said second member as deep as the thickness of each said locking member, and said first member also having, adjacent to and continuous with said depressions a recess which, in combination with the holes passing through said second member, has a depth less than the thickness of each said locking member, said locking member being, in the attached position of said first tool and a second well tool, located within said holes therefor and in contact with said recess and in part projecting from said holes, a shoulder on said first member, a shoulder on said second member, an elastic compression member between said shoulders urging said shoulders away from each other, a third member held in place relative to said first member by frangible means attached to said first member, means on said first member additional to said frangible means limiting the movement of said first member relative to said second member on rupture of said frangible means, one of the depressions in said first member then being adjacent said holes in said second member whereby each locking member passes into said one of said depressions and the projection of said locking member from the second member is reduced.

References Cited by the Examiner

UNITED STATES PATENTS 1,873,914  12/28  Adams _____ 285—101
2,775,137  12/56  Jackson Chung.

CARL W. TOMLIN, *Primary Examiner.*

MORRIS M. FRITZ, *Examiner.*